(12) United States Patent
Sutter

(10) Patent No.: US 11,833,633 B2
(45) Date of Patent: Dec. 5, 2023

(54) TRAY AND MAGAZINE FOR HANDLING PROFILES

(71) Applicant: Stefan Pfaff Werkzeug- und Formenbau GmbH & Co KG, Roethenbach (DE)

(72) Inventor: Anton Sutter, Weiler-Simmerberg (DE)

(73) Assignee: STEFAN PFAFF WERKZEUG-UND FORMENBAU GMBH & CO KG, Roethenbach (DE)

( * ) Notice: Subject to any disclaimer, the term of this patent is extended or adjusted under 35 U.S.C. 154(b) by 87 days.

(21) Appl. No.: 17/453,315

(22) Filed: Nov. 2, 2021

(65) Prior Publication Data

US 2022/0134498 A1    May 5, 2022

(30) Foreign Application Priority Data

Nov. 3, 2020 (EP) .................................. 20205556

(51) Int. Cl.
| | |
|---|---|
| B65D 19/00 | (2006.01) |
| B23Q 7/10 | (2006.01) |
| B23Q 7/04 | (2006.01) |
| B23Q 7/14 | (2006.01) |
| B65G 1/14 | (2006.01) |
| B65G 65/02 | (2006.01) |

(52) U.S. Cl.
CPC ................. *B23Q 7/10* (2013.01); *B23Q 7/04* (2013.01); *B23Q 7/1426* (2013.01); *B65G 1/14* (2013.01); *B65G 65/02* (2013.01)

(58) Field of Classification Search
CPC ............. B23Q 7/10; B23Q 7/04; B65G 65/02
See application file for complete search history.

(56) References Cited

U.S. PATENT DOCUMENTS

| 2,774,505 A | 12/1956 | Ipsen |
| 4,656,717 A | 4/1987 | MacLeod, Jr. |

FOREIGN PATENT DOCUMENTS

| DE | 10160689 C1 | 7/2003 | |
| DE | 102017116176 | * 1/2019 | ............... B23Q 7/14 |
| DE | 102017116176 A1 | 1/2019 | |
| GB | 2112365 A | 7/1983 | |
| WO | WO 8603327 A1 | 6/1986 | |

OTHER PUBLICATIONS

Search Report for European Patent Application No. 20205556.2 dated Apr. 23, 2021, 9 pages.

\* cited by examiner

*Primary Examiner* — Lynn E Schwenning
(74) *Attorney, Agent, or Firm* — Christopher J. Volkmann; Kelly, Holt & Christenson, PLLC

(57) ABSTRACT

To increase the degree of automation in the manufacture of profiles, a tray for the interim storage, the handling and the transport of profiles is proposed, comprising: a frame, and at least two carriers which are secured parallel to one another on the frame, in order to retain and/or mount respective profiles on the carriers, wherein a stop is provided, said stop being provided at one end of the carriers in the longitudinal extent thereof and/or at one end of the frame, in order to be used as a reference point for the position of the profiles. Moreover, corresponding magazines and a transport device and a processing device are proposed.

12 Claims, 5 Drawing Sheets

TRAY AND MAGAZINE FOR HANDLING PROFILES

CROSS-REFERENCES TO RELATED APPLICATION

This application claims the benefit of European Application No. 20205556.2, filed Nov. 3, 2020, the entirety of which is incorporated herein by reference, further the entirety of the attached translation of European Application No. 20205556.2 is incorporated by reference.

BRIEF SUMMARY

A tray for the interim storage, the handling and the transport of profiles includes a frame and at least two carriers which are secured parallel to one another on the frame, configured to retain and/or mount respective profiles on the carriers. The tray includes a stop, being provided at one end of the carriers in the longitudinal extent thereof and/or at one end of the frame, in order to be used as a reference point for the position of the profiles.

DETAILED DESCRIPTION

Figure 1:
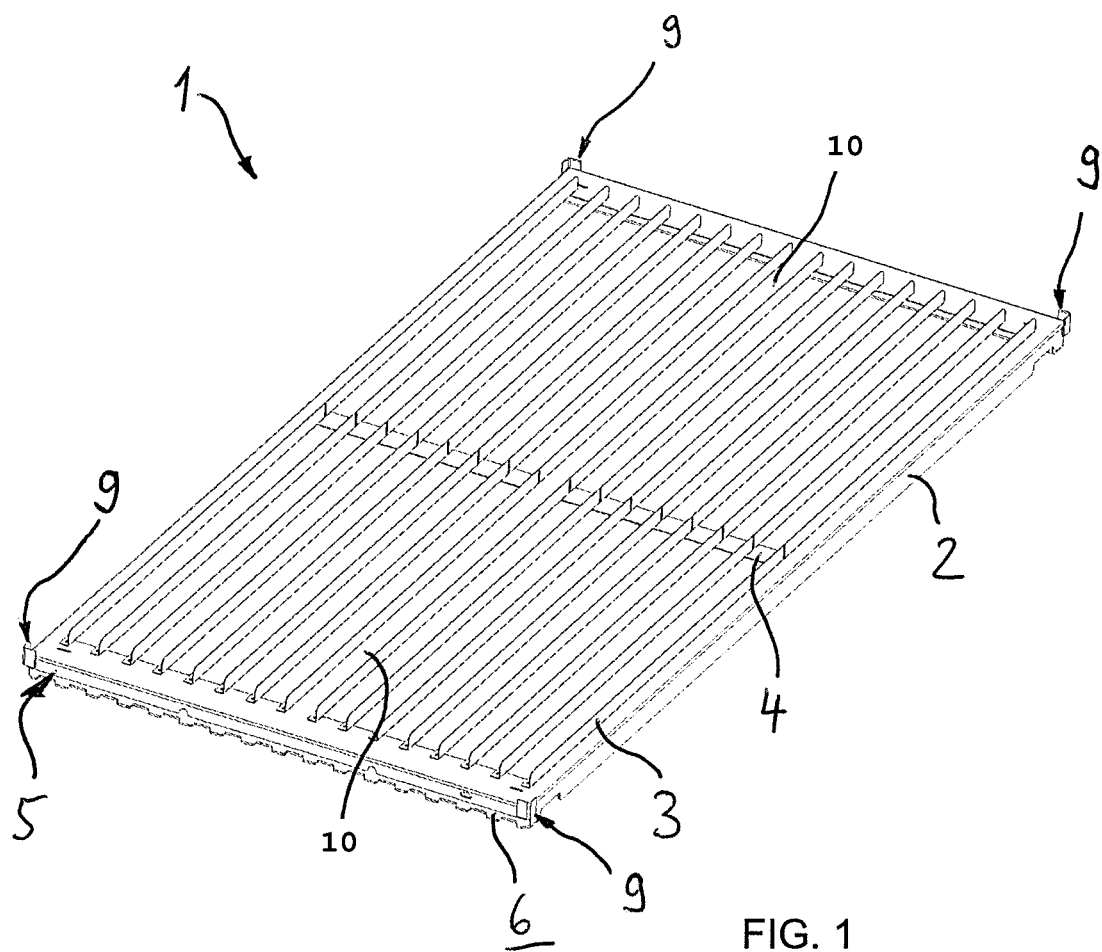
FIG. 1 shows an example tray.

Profiles, which are used for example as plastic injection molded parts for door seals or the like, generally have to go through several steps during production. After their extrusion, they generally have to be provided with trims. Moreover, there is in most cases the overmolding of end portions or the connection to further partial profiles by overmolding. According to the prior art, the logistics between these individual processing steps, in which the profiles are each usually further processed in a processing station, consist of purely manual handling. That is to say, the profiles are transported from one processing station to the next by hand, placed into a mold or removed therefrom. Moreover, after a processing step, the profiles are for this purpose typically collected in boxes, stored in the interim or carried to the next station. Here too, the profiles are placed manually into the boxes and also removed again manually. Moreover, as has already been described, the positioning for the next work step, for example the insertion of such a profile into a mold, is also usually performed manually. These manual logistics interposed between the individual processing steps according to the prior art are generally time-consuming and labor-intensive.

One embodiment disclosed herein is able to reduce costs and increase the degree of automation in the manufacture of such profiles.

The tray according to an embodiment is not hitherto known as a device from the prior art. It can be used for the interim storage, the handling and the transport of profiles and for this purpose firstly comprises a frame, and at least two carriers which, similar to slats, are secured parallel to one another on the frame. Profiles are placed onto and retained on the respective carriers. Profiles can thus be held on the carrier in a defined manner, i.e. in a defined position and defined setting, until they have to be removed for further processing. On account of this precisely known position of the profiles on the carrier, the removal can also be performed by robots. In addition, the loading of the carrier can also be effected by robots. Finally, a stop is provided which supplies a defined position when the profiles are placed onto the respective carriers, such that a defined starting point for each profile prepared on the tray is present when the tray is stored in the interim or transported. Generally, the profiles are removed from the carrier in order to be further processed. By virtue of the fact that a stop is provided on one side of the frame, a defined removal of the profiles or a defined positioning of the profiles can be carried out accordingly. In the longitudinal extent of the carriers, the stop is generally provided at the end thereof, in particular at the end of the frame. From the other, opposite side, pressure can be applied in order to keep the position stable. If the frame is the outer part which also bears on the guides of the transport paths or is gripped by a robot, the profiles are also not scratched.

The degree of automation can thus be improved. Thus, the profiles can be delivered and set down automatically, specifically without additional operating personnel. Within a defined profile cross section, details of different products and product lengths can be used flexibly and repeatedly in the production. It is also conceivable that a tray is loaded such that two or more profiles are arranged one behind another on one carrier.

The provision of a stop on a tray can also afford the advantage that tolerances between the trays can be compensated. The positioning of the profiles in the longitudinal direction is generally crucial for ensuring a defined position for the further work steps. By virtue of the fact that a stop is used on one side, there is also a well-defined positioning of the profile. Length tolerances of the tray are therefore generally unimportant because, by pressure, the stop as a start point of any measurement or as reference point lies at a well-defined position. Thus, the profiles then also lie at a well-defined position.

The tray according to an embodiment comprises a carrier onto which the profile can be mounted. The profiles themselves can generally already be provided themselves with an (integrated) carrier, e.g. made of plastic or metal, such that they have a certain dimensional stability in contrast to flexible profiles; these carriers of the carrier profiles are transported along with the latter. The carrier profiles are also mounted with their integrated carrier onto the (further) carrier onto the trays (cf. illustrative embodiment according to FIG. 3).

In one illustrative embodiment, the frame itself can form the stop. The stop forms a start point for any length measurement and positioning of the profiles which are already held in a predefined manner by the carriers. Moreover, the frame lies as a fixed and if appropriate also outermost reference point and is in any case, e.g. during transport, in contact with other devices.

In one embodiment, the carriers can have, along their longitudinal extent, a thickening for preventing slippage of the profiles along the individual carriers. Typically, a profile has for example a U-shaped portion which is mounted on the carrier. In the longitudinal extent along the carrier, the profile can then only move when it does not have to overcome such a mechanical barrier. In this way, it is advantageously achieved, on the one hand, that the profile is mounted in a stable manner on the carrier even during the transport of the trays, and, on the other hand, that optionally a plurality of profiles also cannot slip relative to one another as long as they have been mounted on the carrier.

In principle, a transport possibility involves placing the tray onto a conveyor belt and allowing it to travel along with the conveyor belt. To permit this in a precisely defined manner, a toothing in particular can be provided which, for example, extends along one frame side, in particular along the side extending perpendicular to the longitudinal extent of the carriers. The advance movement of the tray can thus be permitted by engagement in this toothing. Particularly advantageously, the toothing permits a well-defined movement of the tray on a conveyor belt. The advance movement is precisely defined by engagement in the toothing, and therefore how the trays move individually.

In one embodiment, the carriers can be designed as L-shaped angle profiles (made of aluminum or also stainless steel). One limb of the L-shape can be used to be attached to the frame. Typically, the carriers can be screwed onto the frame, but also in principle riveted. Moreover, in a variant of the carrier, latching can be provided via latching grooves. Individual lamellae of the profiles can latch into these, as a result of which it is possible to prevent the profiles from slipping or even falling off the tray during transport.

For the interim storage itself, it is particularly advantageous if, in one embodiment, the tray in the loaded and/or unloaded state is mounted on one or more further loaded or unloaded trays. In the process of production of the profiles, the trays, which can carry a specific number of profiles, can be stacked and intermediately stored or transported to the next processing station. For these purposes, spacers are provided in particular at the corners of the trays, such that the trays can be stacked on top of one another and the spacers prevent the profiles from being squashed or scratched. Moreover, the spacers can allow stable mounting of the trays.

For this purpose of interim storage and transport of the profiles, it is in particular possible to provide a magazine into which the trays can be stacked. For this purpose, on the floor, guide rails or a kind of pallet can be used on which the trays can be placed on top of one another in a defined manner Precisely in the case of transport via a conveyor belt, the individual trays can thus be delivered to the conveyor belt one after another in an automated manner, by means of the trays always being taken individually from the stack of the magazine. This can also be effected directly via a handling system with which, for example, the upper tray of a magazine is taken hold of and transferred onto the conveyor belt.

Accordingly, a transport device according to one embodiment for the transport of profiles is distinguished in that a conveyor belt and at least one tray according to the embodiment is provided, wherein the conveyor belt has a driver device which is provided for engagement in the toothing of the at least one tray. In addition, a transport device of this kind can advantageously comprise a magazine into which the trays are stacked, such that they can be picked up individually and, for example, positioned onto the conveyor belt.

By means of a gripper, the individual trays can be removed from a magazine stack or placed onto a magazine stack. The gripper function can be performed by robots. Such a gripper can extend, for example, like a bridge over the conveyor belt or magazine and operate with a gripping device or with a pallet which is driven under the trays and can lift these and, for example, deliver them to the conveyor belt. This permits particularly simple and compact automation. In addition, with the aid of the magazines, a very large number of profiles can be stored within a very small space and transported onward. As has already been mentioned, the magazines themselves can be stored on different pallets or on one pallet and likewise transported as such.

Alternatively, the trays can also be filled for the first time in the first processing step, in order then to be further processed.

In addition, the trays also make it possible to perform parallel processing when stacked in a magazine. During the passage through a processing line, the profiles can be removed from the trays and also applied again. Another possibility is to remove the trays, deliver them to the processing station, take the profiles from the trays and stack the empty trays into a new magazine. The trays according to one or more embodiments, are thus distinguished in that they offer a particularly high degree of flexibility and, even after changing processes (e.g. when changing the manufacture to new profiles), it is possible in principle to continue working with the same trays. They are therefore highly suitable for the automation, and costs can be further reduced, since the same trays can be used for different procedures.

FIG. 1 shows a tray 1 composed of a frame 2 and of a multiplicity of carriers 3. The carriers 3 are arranged parallel to one another on the frame 2. To save material and to permit the best possible access to the carriers 3 and to the profiles placed on the latter. the frame 2 encloses an opening. To increase the stability, only transverse struts 4 are provided, specifically in the longitudinal direction and perpendicular thereto. A stop 5 is provided on one side at the end of the longitudinal struts 10 or carriers 3. The profiles can thus be placed in a defined manner on the carriers, and the stop moreover serves as a starting point for each measurement or for the defined removal or placement of the profiles. In the lower region of the frame, a toothing 6 is arranged which serves for transport. The tray 1 can thus be transported, for example perpendicular to the longitudinal extent of the carriers 3, over a conveyor belt. To stack the trays 1 into what are called magazines 20, 30, spacers 9 are mounted at the respective corners in order to allow the trays 1 to be stacked at a defined spacing, such that the profiles P are also not clamped. In the present case, the spacers 9 are, for example, angle profiles located at the corners and standing perpendicular to the plane of the frame.

Figure 2:
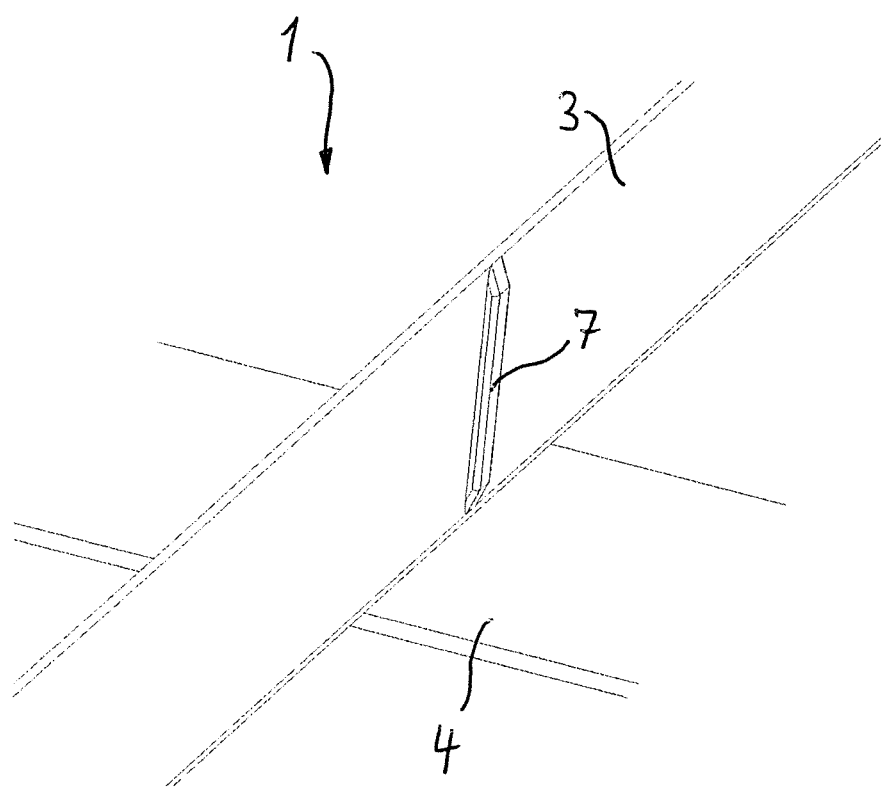
FIG. 2 shows an example detail from FIG. 1 with a thickening on the carrier.

FIG. 2 shows a detail again from FIG. 1, wherein the transverse strut 4 of the frame 2 serves for strengthening purposes. The carrier 3 placed perpendicular thereto can also be seen. Along its longitudinal extent, the carrier 3 has a thickening 7 which is intended to prevent the profiles from being able to be displaced in the longitudinal direction.

Figure 3:
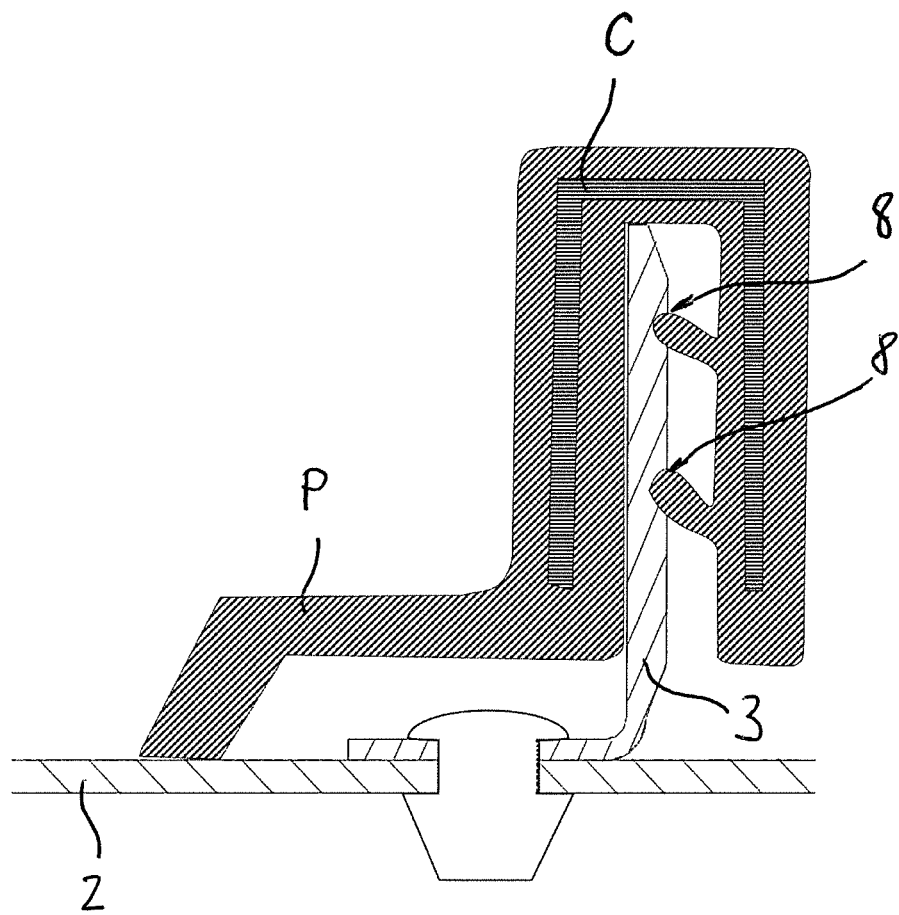
FIG. 3 shows a sectional view through an example carrier, loaded with a profile, of a tray according to FIG. 1.

FIG. 3 shows a longitudinal section through a frame 2 with a carrier 3 onto which a profile P is placed. On one limb, the carrier 3 is screwed to the frame 2. Moreover, the carrier 3 has latching grooves 8 in which lamellae of the profile P can engage. The profiles P are thus mounted securely on the carrier 3 and cannot fall off or slip. The profile P is a carrier profile, which is equipped with an integrated carrier C, the latter being formed in a U-shape in the profile and ensuring the dimensional stability of the profile P.

Figure 4:
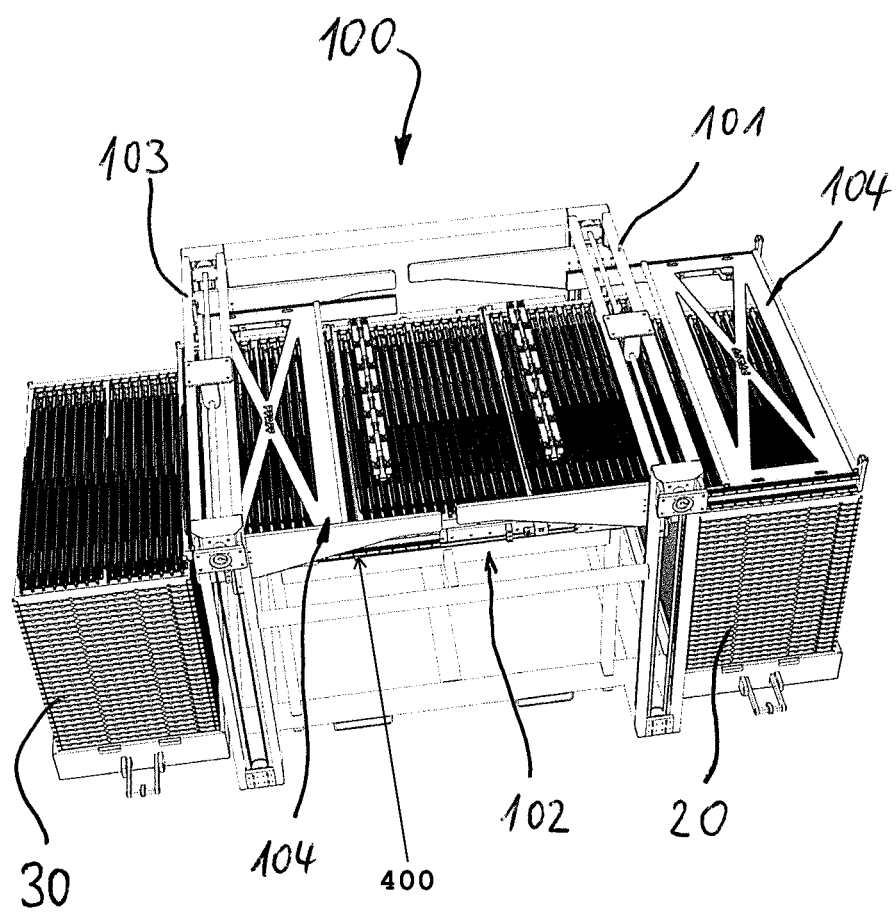
FIG. 4 shows an example transport device with magazines.

FIG. 4 shows a transport device 100 according to one embodiment with two magazines 20, 30. The magazine 20 stands at the start of the transport path and is loaded with profiles. The trays 1 are lifted from the magazine stack 20 by a gripper 101 and delivered to a conveyor belt 102. The conveyor belt 102 transports the trays 1 in the direction of the magazine 30. The conveyor belt 102 has a driver device 400 which is provided for engagement in a toothing of the trays 1. The gripper 103 which stacks the trays I back onto the magazine 30 is located at the end of the transport path. For handling purposes, the grippers 101, 103 of the conveyor belt 102 have a kind of pallet 104 which is driven in each case under the trays 1. In addition, robots can be provided on the transport path of the conveyor belt 102 in order to remove the profiles for processing and, if appropriate, to place them back again on the trays. In principle, however, empty trays can also be stacked in the region of the magazine 30.

Figure 5:
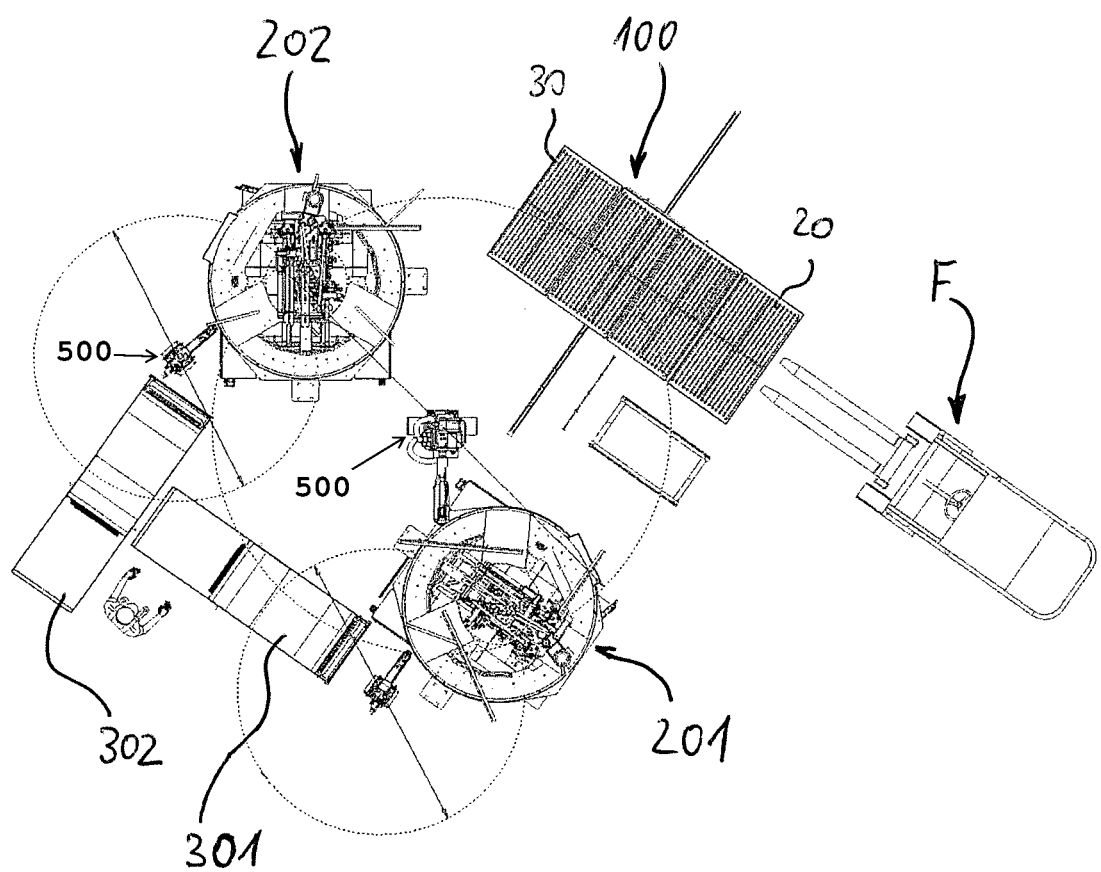
FIG. 5 shows an example arrangement with transport devices and turntables.

FIG. 5 shows how such a transport device 100 can be brought into the working region of two turntables 201, 202 which function as proce sin stations and each perform a processing of profiles. These can be fed from a further transport device 100 which singulates the profiles or such like. The profiles processed in the turntables 201, 202 are finally placed into the magazines 20, 30 via the transport device 100. In this case.. the magazine 20 is empty and is loaded (i.e., by loading device 500) on the transport path of the conveyor belt. The loaded trays 1 are placed on the magazine 30. The magazines 20, 30 can be transported with the aid of a pallet truck F, since the trays 1 stand on a kind of pallet. Moreover, the turntables can be loaded via the profile containers 301, 302 (e.g. boxes with profiles, further magazines). For example, profiles and partial profiles can be made available via the magazines 20, 30 or the profile containers.

LIST OF REFERENCE SIGNS 1 tray
2 frame
3 carrier
4 transverse struts
5 stop
6 toothing
7 thickening
8 latching groove
9 spacer
20 magazine
30 magazine
100 transport device
101 gripper
102 conveyor belt
103 gripper
104 pallet/handling system for trays
201 turntable
202 turntable
301 profile container
302 profile container
C carrier integrated in the profile
F pallet truck
P profile

The invention claimed is:

1. tray for the interim storage, the handling and the transport of profiles, the tray comprising:
a frame;
at least two carriers which ate secured parallel to one another on the frame, in order to retain and/or mount respective profiles on the carriers, wherein each carrier, of the at least two carriers, is designed as an L-shaped angle profile, wherein one limb of the L-shape angle profile is configured for securing to the frame, and one limb of the L-shape angle profile has latching grooves for latching engagement of profile lamellae of the profiles for retaining the profiles; and
a stop, being provided at one end of the carriers in a longitudinal extent thereof and/or at one end of the frame, in order to be used as a reference point for a position of the profiles.

2. The tray of claim 1, wherein the frame forms the stop.

3. The tray of claim 1, wherein one or more carriers, of the at least two carriers, have, along a longitudinal extent of the one or more carriers, a structure that extends from the one or more carriers for preventing slippage of the profiles.

4. The tray of claim 1, comprising a toothing along one frame side; extending perpendicular to the longitudinal extent of the carriers, in order to permit an advance of the trays for transporting the profiles.

5. The tray of claim 1, wherein the frame is strengthened by at least one transverse strut perpendicular to the longitudinal extent of the carriers and/or at least one longitudinal strut parallel to the longitudinal extent of the carriers.

6. The tray of claim 1, wherein the tray in a loaded and/or unloaded state can be stacked under and/or on top of a further tray in the loaded and/or unloaded state, wherein spacers are mounted in particular at corners of the tray in order, during the stacking of the trays, to form a stop in relation to a tray lying above or below.

7. A magazine for the interim storage and/or the transport of profiles, the magazine comprising:
at least two trays arranged in a stack, wherein each tray, of the at least two trays, comprises:
a frame;
at least two carriers which axe secured parallel to one another on the frame, in order to retain and/or mount respective profiles on the carriers, wherein each carrier, of the at least two carriers, is designed as an L-shaped angle profile, wherein one limb of the L-shape angle profile is configured for securing to the frame, and one limb of the L-shape angle profile has latching grooves for latching engagement of profile lamellae of the profiles for retaining the profiles; and
a stop, being provided at one end of the carriers in a longitudinal extent thereof and/or at one end of the frame, in order to be used as a reference point for a position of the profiles.

8. A transport device for the transport of profiles, the transport device comprising:
a conveyor belt; and
at least one tray comprising:
a frame:
at least two carriers which are secured parallel to one another on the frame, in order to retain and/or mount respective profiles on the carriers, wherein each carrier, of the at least two carriers, is designed as an L-shaped angle profile, wherein one limb of the L-shape angle profile is configured for securing to the frame, and one limb of the L-shape angle profile has latching grooves for latching engagement of profile lamellae of the profiles for retaining the profiles; and
a stop, being provided at one end of the carriers in a longitudinal extent thereof and/or at one end of the frame, in order to be used as a reference point for a position of the profiles; and
wherein the conveyor belt has a driver device which is provided for engagement in a toothing of the at least one tray.

9. The transport device of claim 8, comprising a magazine into which the trays are stacked.

10. The transport device of claim 9, comprising a transfer device configured to pick up the at least one tray from the magazine and place the at least one tray onto the conveyor belt, the transfer device comprising at least one of a gripper or a robot.

11. The transport device of claim 8, comprising at least one loading device configured to remove profiles from the tray and/or to load the tray, the at least one loading device comprising at least one of a gripper or a robot arm.

12. A processing device for the processing of profiles, the processing device comprising:
   a transport device;
   a processing station; and
   a loading device configured to load the processing, station with profiles from a tray from a conveyor belt and, after processing the profiles, to load the tray with the processed profiles back on the conveyor belt, wherein the tray comprises:
   a frame;
   at least two carriers which are secured parallel to one another on the frame, in order to retain and/or mount respective profiles on the carriers, wherein each carrier, of the at least two carriers, is designed as an L-shaped angle profile, wherein one limb of the L-shape angle profile is configured for securing to the frame, and one limb of the L-shape angle profile has latching grooves for latching engagement of profile lamellae of the profiles for retaining the profiles; and
   a stop, being provided at one end of the carriers in a longitudinal extent thereof and/or at one end of the frame, in order to be used as a reference point for a position of the profiles.

\* \* \* \* \*